Patented Nov. 15, 1938

2,136,877

UNITED STATES PATENT OFFICE 2,136,877

INSULATORS, HEAT RESISTING AND SIMILAR ARTICLES, AND METHODS OF MANUFACTURING THE SAME

Gaston Delpech, Clamart, and Roger Lambert, Levallois-Perret, France, assignors to Societe Anonyme des Manufactures des Glaces & Produits Chimiques de Saint-Gobain, Chauny & Cirey, Paris, France No Drawing. Application April 6, 1934, Serial No. 719,294. In France April 11, 1933

7 Claims. (Cl. 154—2.6)

This invention relates to insulators, heat resisting and similar articles and methods of manufacturing the same, and refers more particularly to vitreous articles consisting of mica mixed with other substances.

Heretofore, only certain types of mica were used for these purposes, such as the common potash mica, the so-called muscovite, which is the light-colored mica of granite and similar rocks, or the paragonite which is an analogous soda species. Magnesia mica was not used for this purpose, because it is opaque and does not cleave regularly.

The term "magnesia mica" is used in this specification as including different varieties of naturally occurring magnesium silicates, such as biotite (including meroxene and anomite, distinguished according to the position of the optic axial plane), which is the black or dark-green mica of granite, gneiss, micaslates, etc. and phlogopite, which is the bronze-colored species common in crystalline limestone and serpentine rocks.

Experiments have shown that magnesia mica has a much greater resistance against corrosion caused by molten glass than potash mica. Furthermore, magnesia mica is substantially devoid of chemical reaction with a vitreous binder and has a remarkable stability at temperatures, which may be as high as 900° C., while at the same temperature the muscovite loses its water of constitution.

An object of the present invention is the provision of electrical insulators, heat resistors and other objects which are made of a substance containing magnesia mica.

A further object is the provision of a method for uniting magnesia mica with other substances to form a mixture which can be readily used for the manufacture of heat resisting plates, electrical insulators and the like.

The above and other objects of the present invention may be realized by adding to magnesia mica a mixture of substances used in the manufacture of glass (such as a mixture of silica, alkali metal oxide and alkali earth metal oxide) and by heating the entire mixture to a temperature which should be high enough to enable the vitreous binder or flux to pass from a solid to a semi-liquid state. After the entire mixture has become soft by this heating, it is compressed in metallic molds, which are, preferably, heated to a temperature of about 400° C.

While many different vitreous binders may be mixed with magnesia mica, it is advisable to use mixtures containing both silica and boracic acid, various bases, such as a lead compound, for instance, minium, and cryolite. Although these mixtures have a very low fusing temperature, they form with magnesia mica a product which has a very high di-electric strength and is not readily affected by water or the atmosphere.

The invention will appear more clearly from the following example, illustrating the inventive idea:

Example 10 parts of cryolite are mixed with the same quantity of silica. To the mixture are added, 30 parts of minium ($Pb_3O_4$), 15 parts of feldspar and 35 parts of boracic acid. After mixing these substances a mass is obtained, which becomes soft at a temperature of 420° C.

To the mixture are added 150 parts of magnesia mica and then the entire mixture is heated to a temperature of about 420° C.

The softened mixture is compressed in metallic molds at a temperature of about 400° C. to form plates or articles of various shapes and cooled.

Insulators produced by this process, after having been placed in water for about 72 hours, are still able to resist a voltage of about 38,000 volts for a section of 72 square millimeters, and a distance between the fixing collars of 90 millimeters.

By this process molded articles of any desired form are produced which have a much greater resistance against mechanical forces and heat than the articles manufactured of ground potash mica or potash mica shavings.

What is claimed is:

1. A method of manufacturing heat-resisting and electrically insulating articles, comprising mixing magnesia mica with a mixture containing silica, cryolite, boracic acid and lead oxide, heating the resultant mixture to the softening temperature of the first-mentioned mixture, and compressing the same.

2. A method of manufacturing heat-resisting and electrically insulating articles, comprising mixing magnesia mica with a vitreous binder containing silica and boracic acid, heating the mixture to transform the binder from a solid to a semi-liquid state and then molding the mixture at a temperature of about 400° C.

3. A method of manufacturing heat resisting and electrically insulating articles, comprising mixing magnesia mica which is substantially devoid of chemical reaction with a vitreous binder up to temperatures of about 900° C., with a vitreous binder, heating the mixture until the binder is transformed from a solid to a semi-solid state, and then compressing the softened mixture at a temperature of about 400° C.

4. A heat resisting and electrically insulating article comprising magnesia mica and a vitreous binder.

5. A heat resisting and electrically insulating article comprising phlogopite and a vitreous binder.

6. A heat resisting and electrically insulating article comprising biotite and a vitreous binder.

7. A heat resisting and electrically insulating article comprising a fired mixture of magnesia mica and vitreous substances.

GASTON DELPECH.
ROGER LAMBERT.